US009551455B2

United States Patent
Collings

(10) Patent No.: US 9,551,455 B2
(45) Date of Patent: Jan. 24, 2017

(54) SNOW PLOW EQUIPMENT CARRYING SYSTEM

(71) Applicant: David Anthony Collings, Mississauga (CA)

(72) Inventor: David Anthony Collings, Mississauga (CA)

(*) Notice: Subject to any disclaimer, the term of this patent is extended or adjusted under 35 U.S.C. 154(b) by 73 days.

(21) Appl. No.: 14/600,403

(22) Filed: Jan. 20, 2015

(65) Prior Publication Data

US 2015/0204481 A1 Jul. 23, 2015

Related U.S. Application Data

(60) Provisional application No. 62/043,687, filed on Aug. 29, 2014, provisional application No. 61/929,292, filed on Jan. 20, 2014.

(51) Int. Cl.
*E01H 5/06* (2006.01)
*F16M 13/02* (2006.01)

(52) U.S. Cl.
CPC .............. *F16M 13/02* (2013.01); *E01H 5/066* (2013.01)

(58) Field of Classification Search
CPC .............. E01H 5/066; B60P 1/02; B60R 9/06; F16M 13/02
See application file for complete search history.

(56) References Cited

U.S. PATENT DOCUMENTS

| 2,014,783 | A | * | 9/1935 | Schubert | E01H 5/02 37/241 |
| 2,867,449 | A | * | 1/1959 | Shawver | B62B 5/00 180/11 |
| 3,065,556 | A | * | 11/1962 | Kampert | E01C 19/202 222/165 |
| 3,470,632 | A | * | 10/1969 | Carlton | E01H 5/066 37/273 |
| 3,913,811 | A | * | 10/1975 | Spencer | B60R 9/06 224/497 |
| 4,491,275 | A | * | 1/1985 | Holsworth | A01C 17/00 222/505 |
| 4,796,367 | A | * | 1/1989 | Kulat | E01H 5/02 37/273 |
| 4,906,039 | A | * | 3/1990 | Broman | B60P 1/04 280/769 |
| 7,051,500 | B2 | * | 5/2006 | Martin | A01D 34/64 56/14.9 |
| 7,350,871 | B2 | * | 4/2008 | Przygoda | B60P 1/02 298/17 R |
| 8,701,952 | B1 | * | 4/2014 | Tripp | B60R 11/06 224/543 |
| 2009/0307944 | A1 | * | 12/2009 | Buckbee | E01H 5/066 37/266 |

(Continued)

*Primary Examiner* — Jamie L McGowan
(74) *Attorney, Agent, or Firm* — Dinsmore & Shohl LLP

(57) ABSTRACT

A system for releasably engaging equipment to the rear of a snow plow blade comprises a receiving location on a rear side of a snow plow blade, the receiving location comprising first and second ramp structures that define inclined ramps, and a retaining structure disposed between and above the ramp structures. The retaining structure is shaped and dimensioned such that, when the piece of equipment is in the receiving location, the retaining structure releasably engages a cross member structure of the equipment to suspend the piece of equipment above the ground via the cross member structure.

5 Claims, 20 Drawing Sheets

(56) References Cited

U.S. PATENT DOCUMENTS

| | | | | |
|---|---|---|---|---|
| 2012/0210611 A1* | 8/2012 | Kelly | ........................ | E01H 5/08 37/231 |
| 2013/0068811 A1* | 3/2013 | Matteson | ................ | B60R 11/06 224/401 |
| 2013/0255113 A1* | 10/2013 | Carroll | ...................... | B60R 9/06 37/241 |
| 2015/0204481 A1* | 7/2015 | Collings | ................ | E01H 5/066 37/241 |

\* cited by examiner

SNOW PLOW EQUIPMENT CARRYING SYSTEM

CROSS-REFERENCE TO RELATED APPLICATIONS

This application claims priority of U.S. Provisional Application No. 61/929,292 filed Jan. 20, 2014, and U.S. Provisional Application No. 62/043,687 filed Aug. 29, 2014, the contents of which are incorporated herein by reference.

FIELD OF THE INVENTION

The present invention relates to a system for carrying equipment on vehicles, including a new form of bracket system attachable to snow plows of snow-clearing vehicles for carrying equipment.

BACKGROUND OF THE INVENTION

Snow-clearing vehicles are commonly used in areas that accumulate snow on a regular basis to clear snow and ice from roads and walkways. A common form of snow-clearing vehicle is a pickup truck equipped with a hydraulically raisable snow plow mounted to a hitch frame on the front of a truck for pushing and thereby clearing a path in the snow when the truck is driven forward with the plow in the lowered position. Snow plows are typically straight or V-shaped. Alternatively, snow plows are comprised of two halves or blades adjacent to one another, configurable so that the truck operator can configure the plow blades align to form a straight snow plow, or to angle relative to one another to form a V-shaped orientation.

Often, snow plow vehicle operators will use the truck bed to carry a commercial salter, which typically occupies the bulk of the available space in the truck bed. Other equipment, such as hand-operated drop salters and snow blowers, are often also required to remove snow from areas less accessible by snow plow trucks. As there is little room in the truck bed, this equipment is typically transported in a separate vehicle or trailer hitched to the truck, and further, impose difficulty to the snow plow vehicle operator as the weight of the equipment makes loading and unloading the equipment a time-consuming and physically arduous task. Some have attempted to carry snow blowers on snow-plow mountable platforms which are accessible for loading when the plow is lowered. The snow blower is placed on the platform and is kept from coming off of the platform by a ratchet strap placed around and against the rear of the snow blower. In these cases, the platform occupies much of the space around the snow plow making it harder for the truck operator to access equipment mounted on the platform. The size of such platforms also slows down the unloading process as the truck operator must first clear the boundaries of the platform before steering and driving the snow blower in the desired direction. Further, these platforms add significant weight and bulk to the truck, increasing the cost to drive and operate the vehicle as well as the complexity of maneuvering the vehicle plow. Snow blowers mounted on these platforms are also susceptible to damage from bouncing and/or shifting on the platform as the snow plow truck is driven over bumps, around corners, or generally over rough terrain.

SUMMARY OF THE INVENTION

There is provided a system for releasably engaging, to a blade of a snow plow, a piece of equipment having a cross member structure and a pair of wheels, the cross member structure and the wheels being arranged in the manner of the handle and wheels of a walk-behind snow blower, the system comprising: a first ramp structure, a second ramp structure, and a retaining structure. In use, each of the first and second ramp structures are disposed on a rear side of the blade to define inclined ramps, the retaining structure is disposed on the rear side of the blade between and above the ramp structures, and the ramp structures and retaining structure define a receiving location. The retaining structure is shaped and dimensioned such that, when the piece of equipment is in the receiving location, the retaining structure releasably engages the cross member structure to suspend the piece of equipment above the ground via the cross member structure, and the ramp structures are shaped and dimensioned such that the piece of equipment can be drawn to the receiving location and as the piece of equipment is so drawn, the wheels traverse the ramp structures.

There is also provided a system for releasably engaging to a blade of a snow plow a piece of equipment, the blade of the snow plow having a top edge and being of the type having a mounting bracket on a rear side of the blade, the piece of equipment being of the type having a handle structure, a cross member and one or more wheels, the handle structure, cross member and the one or more wheels being arranged in the manner of the handle, lower cross member and the one or more wheels of a walk-behind broadcast spreader, the system comprising: a bracket which, in use, is disposed on the rear side of the blade and is adapted to receive the cross member of the piece of equipment and, while in receipt of the cross member, permit the piece of equipment to be pivoted about the cross member to a storage position where the handle structure is disposed adjacent the mounting bracket.

Further aspects of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show exemplary embodiments of the present invention in which.

DETAILED DESCRIPTION OF THE INVENTION

Figure 1:
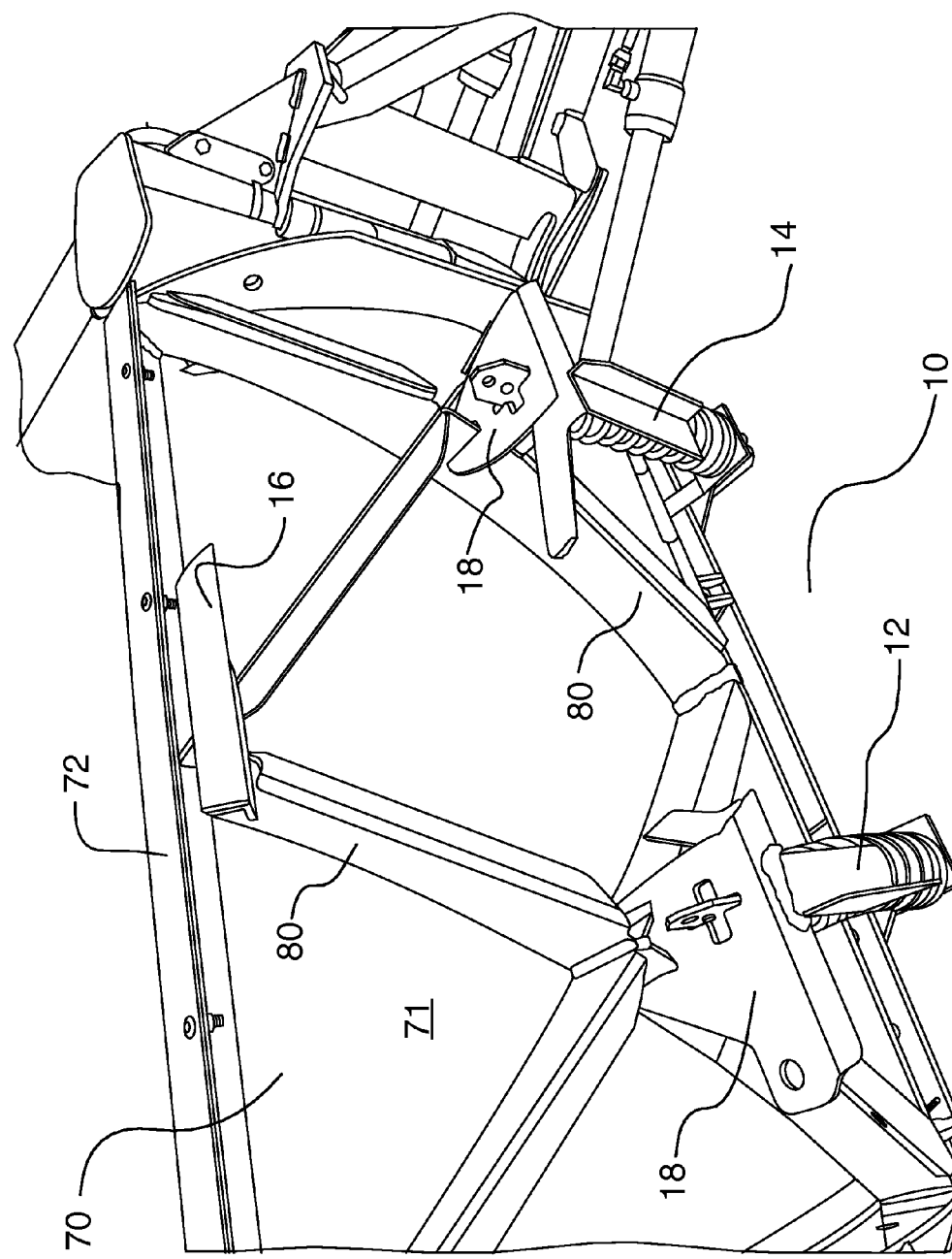
FIG. 1 is a perspective view of a receiving location constructed in accordance with the present invention.
Figure 2:
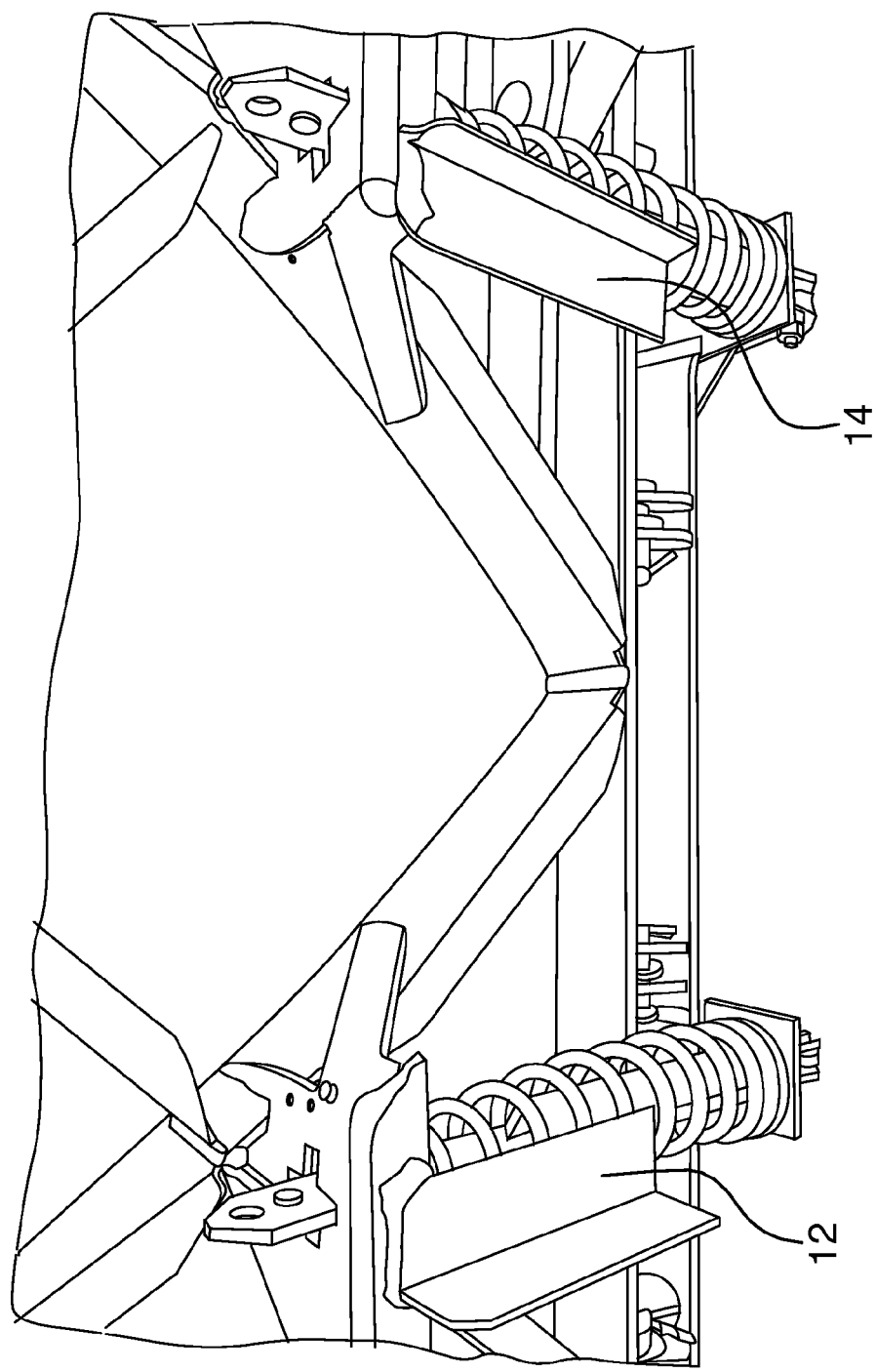
FIG. 2 is a top-down angled front view of the first and second ramp structures constructed in accordance with the present invention.

The present invention may be embodied in a number of different forms. The specification and drawings that follow describe and disclose some of the specific forms of the invention.

Referring to FIGS. 1-5, a receiving location constructed in accordance with an embodiment of the invention is noted generally by reference numeral 10. It is expected that in most cases the receiving location is located on a rear side 71 of a snow plow blade 70, rear side 71 including the back of the plow blade and any attached framing structure, such as arcuate framing structures 80. Typically, the receiving location comprises a first ramp structure 12, a second ramp structure 14 and a retaining structure 16. The first and second ramp structures can define inclined ramps. In most cases it is expected that ramp structures 12, 14 and retaining structure 16 are fixedly attached to the rear side of blade 70, for example, by welding, although other similar methods for secure attachment, permanent or not, are contemplated and within the scope of the present disclosure. The retaining structure 16, in most cases, is disposed between and above the first and second ramp structures. In some embodiments, each of the first and second ramp structures 12, 14 and the retaining structure 16 are angle irons. The angle iron ramp structures 12, 14 are most clearly depicted in FIG. 2, and the angle iron retaining structure 16 is most clearly depicted in FIG. 3.

Receiving location 10 can be used to releasably engage, to the blade of the snow plow, a piece of equipment. Typically, the equipment has a cross member structure 32, as shown in FIG. 5, and a pair of wheels 33, most clearly depicted in FIGS. 3 and 4, although it is contemplated that the equipment can have more or less wheels. It is expected that in most cases, the cross member structure and the wheels are arranged in the manner of the cross member structure 32 of handle frame 34 and the wheels 33 of a walk-behind snow blower. Other similarly configured pieces of equipment, such as lawnmowers, can also be releasably engaged by the receiving location.

Figure 13:
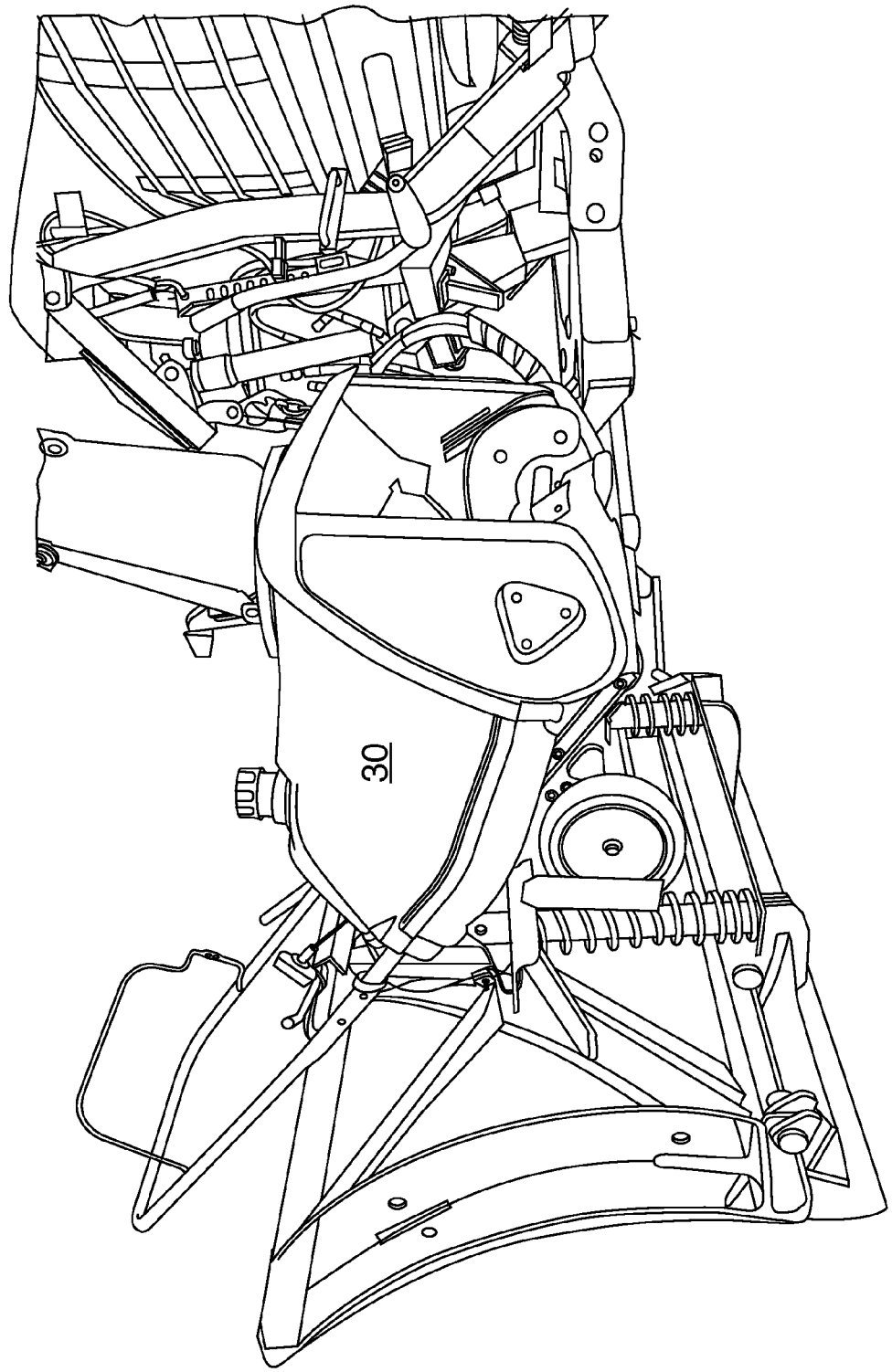
FIG. 13 shows a snow blower in the receiving location and suspended above the ground when the snow plow blade is in contact with the ground.

Referring to FIGS. 5 and 13, it is expected that in most cases, the retaining structure is shaped and dimensioned such that, when the piece of equipment is in the receiving location, the equipment is suspended above the ground via cross member structure 32. Particularly, retaining structure 16 is expected, in most cases, to be positioned near an upper edge 72 of the snow plow blade 70, so that when retaining structure 16 releasably engages cross member structure 32, when the snow plow is in contact with the ground, snow blower 30 remains suspended above the ground, as clearly depicted in FIG. 13.

Figure 3:
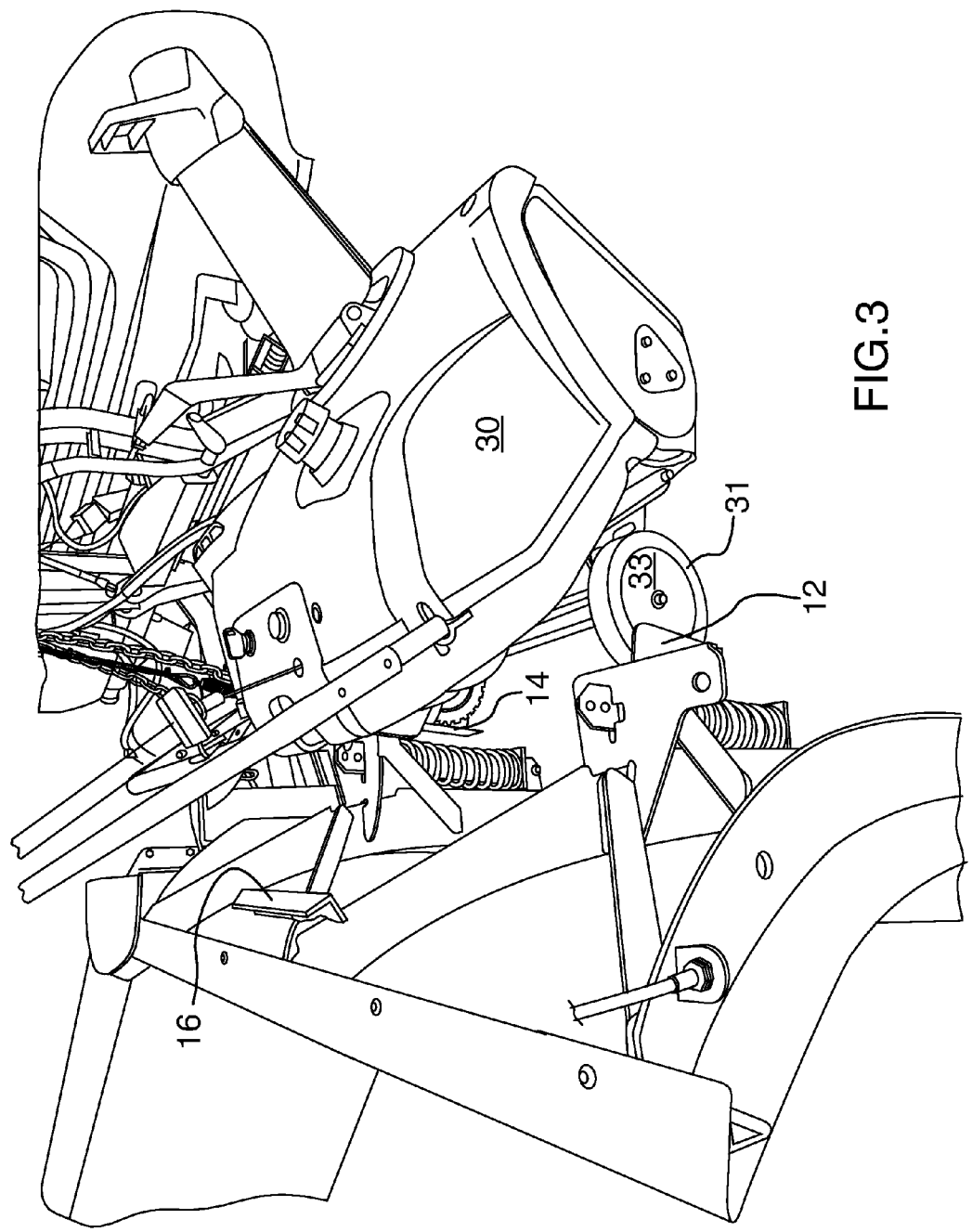
FIG. 3 is a perspective view showing a snow blower being drawn up the first and second ramp structures into the receiving location.
Figure 4:
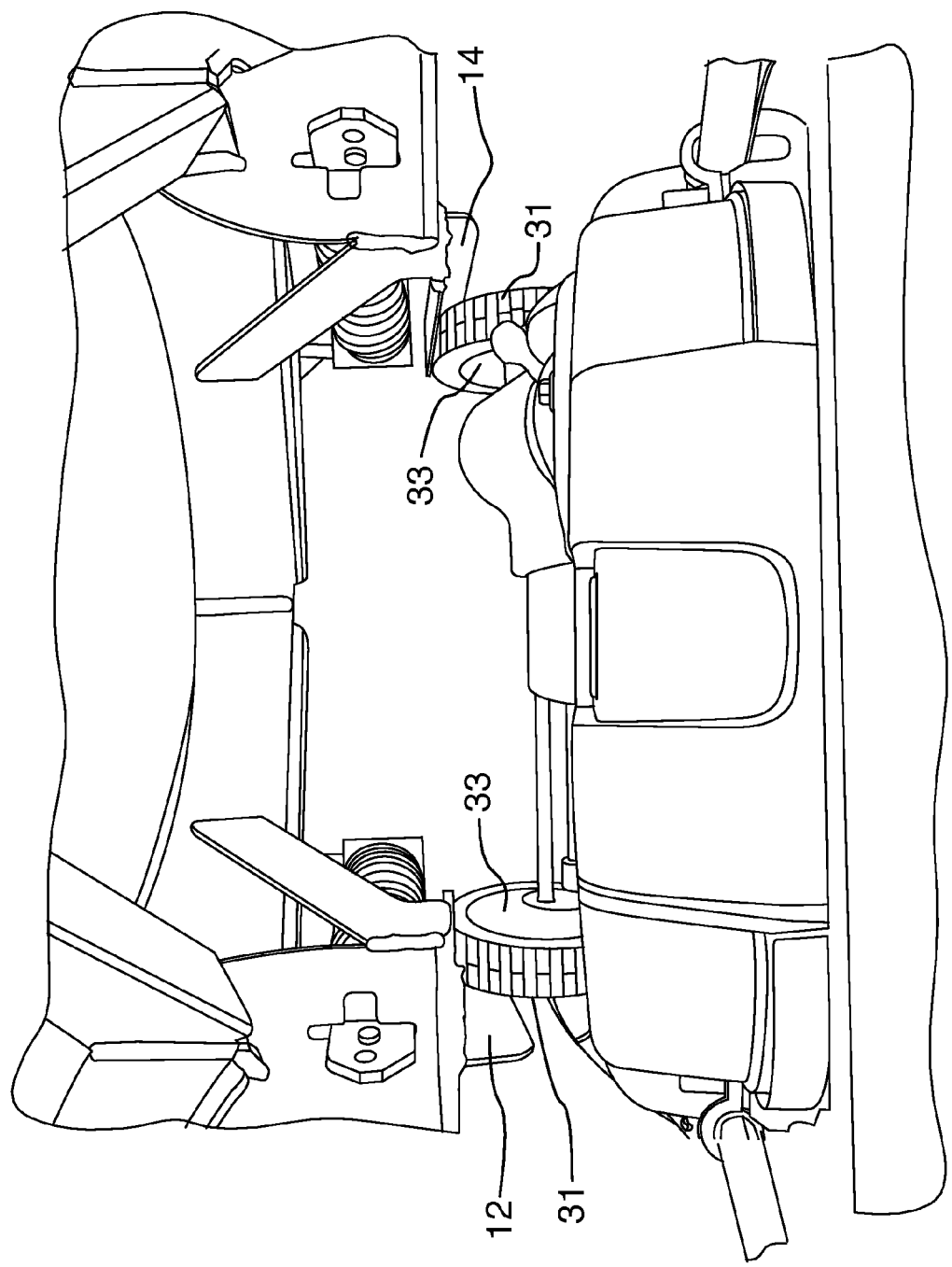
FIG. 4 is a top view of the snow blower and ramp structures depicted in FIG. 3.
Figure 5:
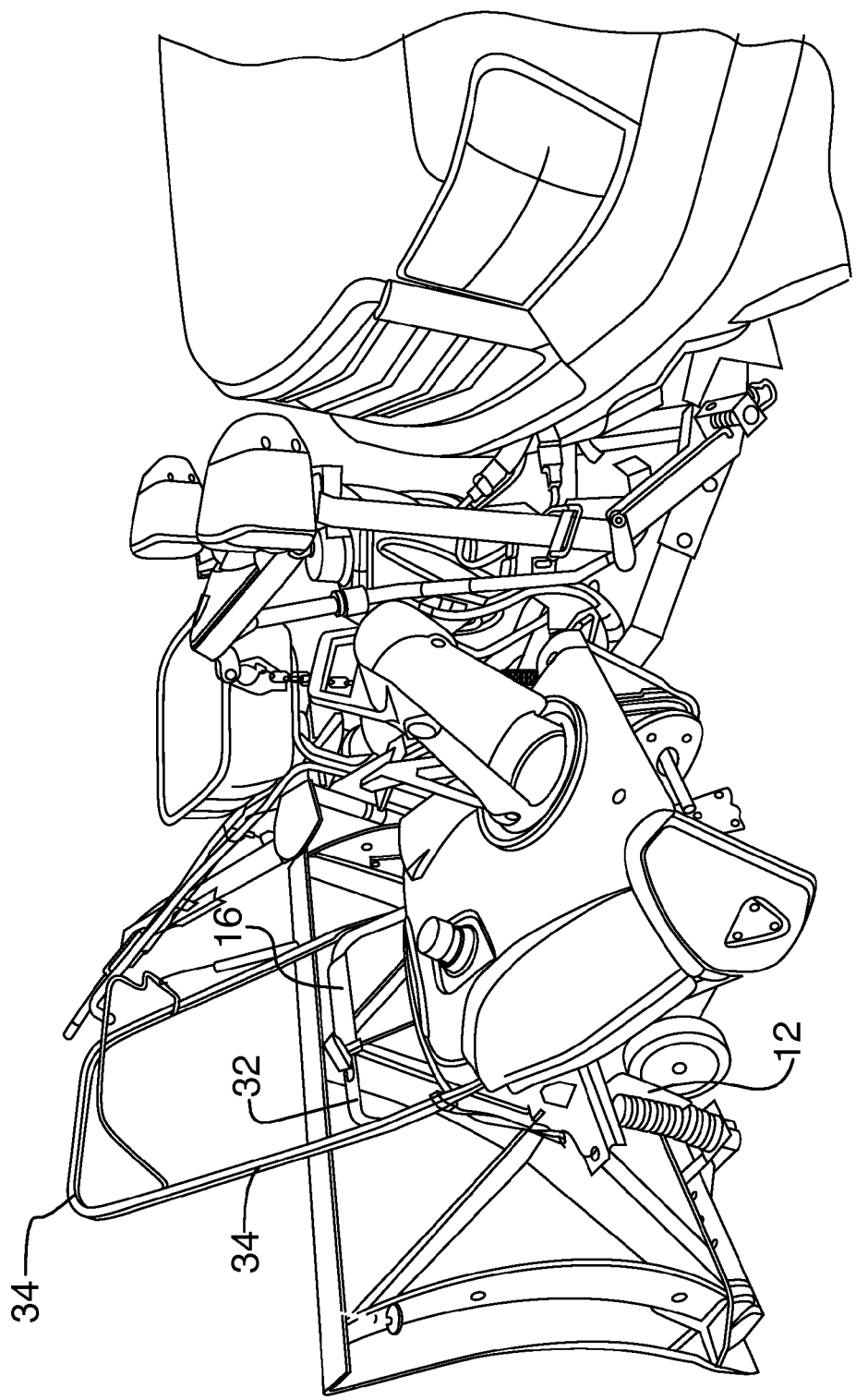
FIG. 5 shows a snow blower suspended above the ground in the receiving location of FIG. 1 while the snow plow is in a V-orientation and raised.

Referring to FIGS. 3 and 4, in most cases it is expected that ramp structures 12, 14 are shaped and dimensioned such that the piece of equipment can be drawn to the receiving location and as it is so drawn, wheels 33 traverse the ramp structures. In particular, it is expected that in most cases, ramp structures 12, 14 are spaced apart at a distance that generally corresponds to the spacing between wheels 33. Further, in most cases, ramp structures 12, 14 are expected to be vertically disposed, as most clearly shown in FIG. 2. In this manner, ramp structures 12, 14 are spaced to allow the piece of equipment to fit within the receiving location, and further, to provide a vertically oriented surface over which wheels 33 can traverse when the snow blower is vertically lifted from the ground in order to releasably engage cross member structure 32 with retaining structure 16. In use, ramp structures 12, 14 are expected to significantly reduce the lifting force required to lift heavy wheeled equipment, such as snow blower 30, into the receiving location.

Still with reference to FIGS. 3 and 4, in order to engage wheels 33 with ramp structures 12, 14, in most cases it is expected that the piece of equipment can be drawn via cross member structure 32 or handle frame 34 towards receiving location 10, and positioned such that wheels 33 are generally aligned with ramp structures 12, 14. Subsequently, snow blower 30 can be tilted away from blade 70 to raise the wheels 33 off of the ground and into contact with ramp structures 12, 14, as best shown in FIG. 4. Alternatively, ramp structures 12, 14 may be dimensioned so that they can be contacted by wheels 33 without the need to raise the wheels of the snow blower off of the ground.

In most cases, it is expected that when wheels 33 are in contact with ramp structures 12, 14, sidewalls 31 of the wheels come into contact with ramp structures 12, 14 so that the ramp structures substantially restrain lateral movement of the piece of equipment when the equipment is in the receiving location.

The embodiment depicted in FIGS. 1-5 is expected to allow an operator of a snow removal vehicle to releasably engage a snow blower to the rear side of a snow plow blade very quickly, easily, and without the need for a bulky platform apparatus affixed to the plow blade. The ramp structures allow the operator to stand on the front side of the plow blade, and with relative ease, pull on the snow blower handle structure away from the plow blade, in order to move the snow blower up the ramp structures far enough to releasably engage the cross member structure to the retaining structure. Similarly, the operator can easily and quickly lift the snow blower slightly to release the cross member structure from the retaining structure, thereby freeing the equipment from the snow plow blade for use. It will be appreciated that ramp structures 12, 14 can be shaped, dimensioned and/or disposed so that they define inclined ramps that are not vertical, but instead define slopes that form angles relative to the ground that are less than the generally orthogonal orientation depicted in the figures, such as, for example, 70 degrees.

Figure 14:
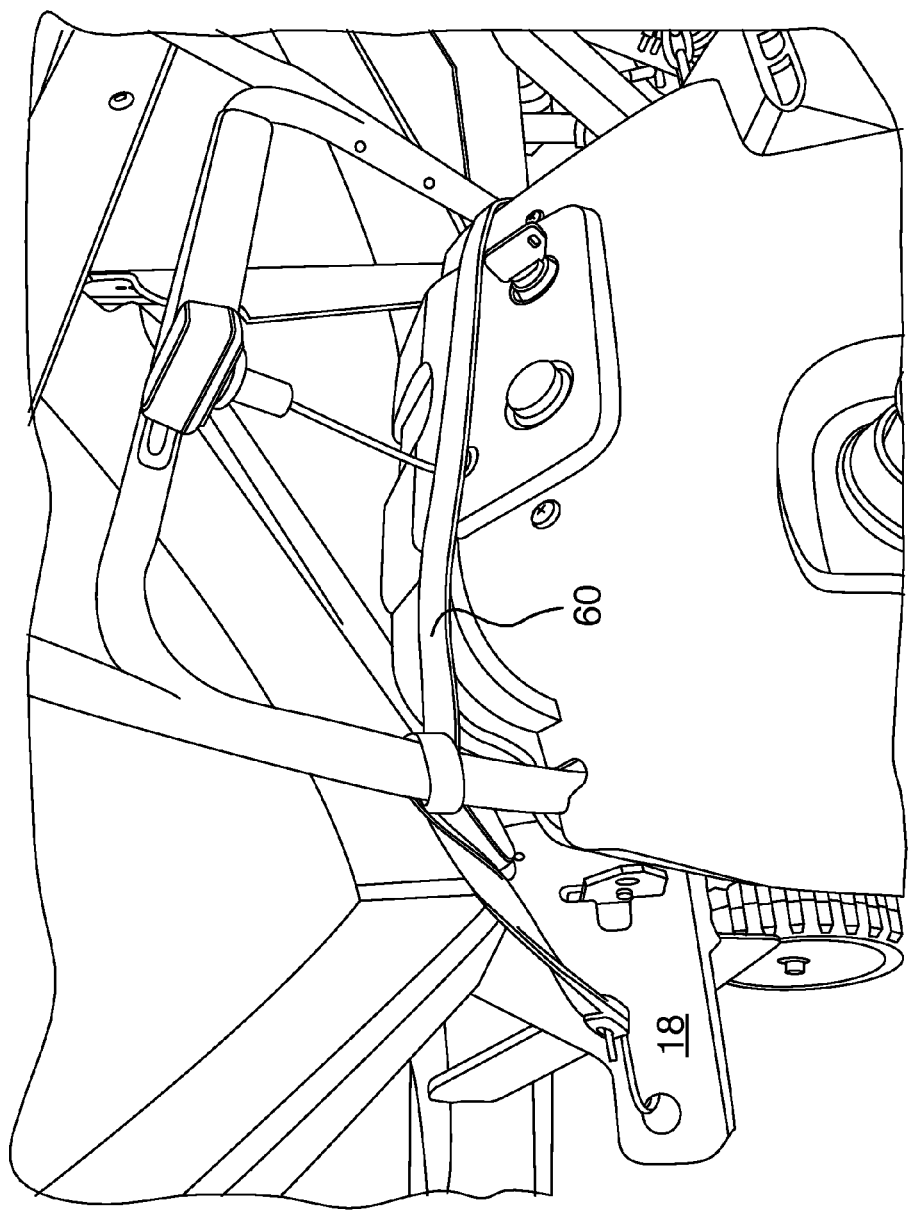
FIG. 14 shows a retaining mechanism releasably attached to a mounting bracket of the snow plow blade used to further retain a snow blower.

The embodiment depicted in FIGS. 1-5 uses the weight of the heavy piece of equipment to securely hold the equipment against the retaining structure and the ramp structures so that, while the snow removal vehicle is driven over roads, the weight of the equipment is expected to prevent the equipment from bouncing off of the retaining structure. Referring to FIG. 14, to further retain the piece of equipment against the plow blade, the operator can employ a retaining mechanism 60 that can be releasably attached to mounting bracket 18. The retaining mechanism can be a bungee cord, chain, rope, ratchet strap, or other flexible material of similar strength.

Referring to FIGS. 6-12, in accordance with another embodiment, there is provided a system for releasably engaging to a snow plow blade a piece of equipment having handle structure 42, cross member 41 and one or more wheels 43. In most cases, it is expected that the handle structure, cross member and one or more wheels are arranged in the manner of the handle structure 42, lower cross member 41 and one or more wheels 43 of a walk behind broadcast spreader 40, such as the salt dropper depicted in FIGS. 7-12. The snow plow blade 70 is expected to have a top edge 72, and in most cases, a mounting bracket 18 on the rear side 71 of the blade 70.

Figure 6:
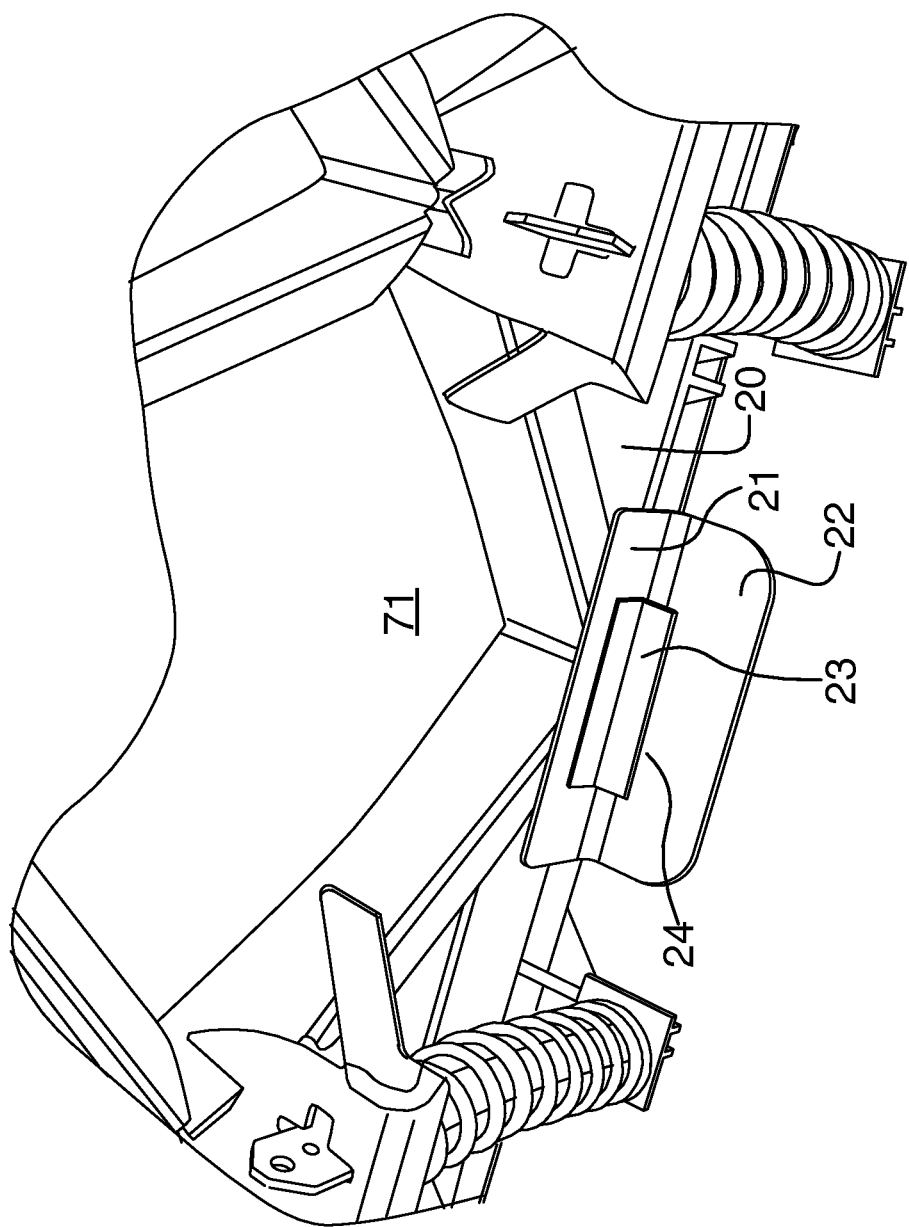
FIG. 6 is a front view of a bracket constructed in accordance with the present invention.

In this embodiment, the system comprises a bracket 20, best shown in FIG. 6. In most cases, the bracket is expected to be disposed on the rear side 71 of the blade. In accordance with an embodiment, the bracket comprises an elongate base 22, an elongate side 21 generally orthogonally fixedly attached to the elongate base along a longitudinal edge of the elongate base, and an elongate structure defining a retaining roof 23 opposite the base. The retaining roof 23 is generally orthogonally fixedly attached to elongate side 21 along a longitudinal edge of the retaining roof. The retaining roof and the elongate base are disposed such that they form gap 24 between them, gap 24 being adapted to receive cross member 41 of the piece of equipment 40.

Figure 7:
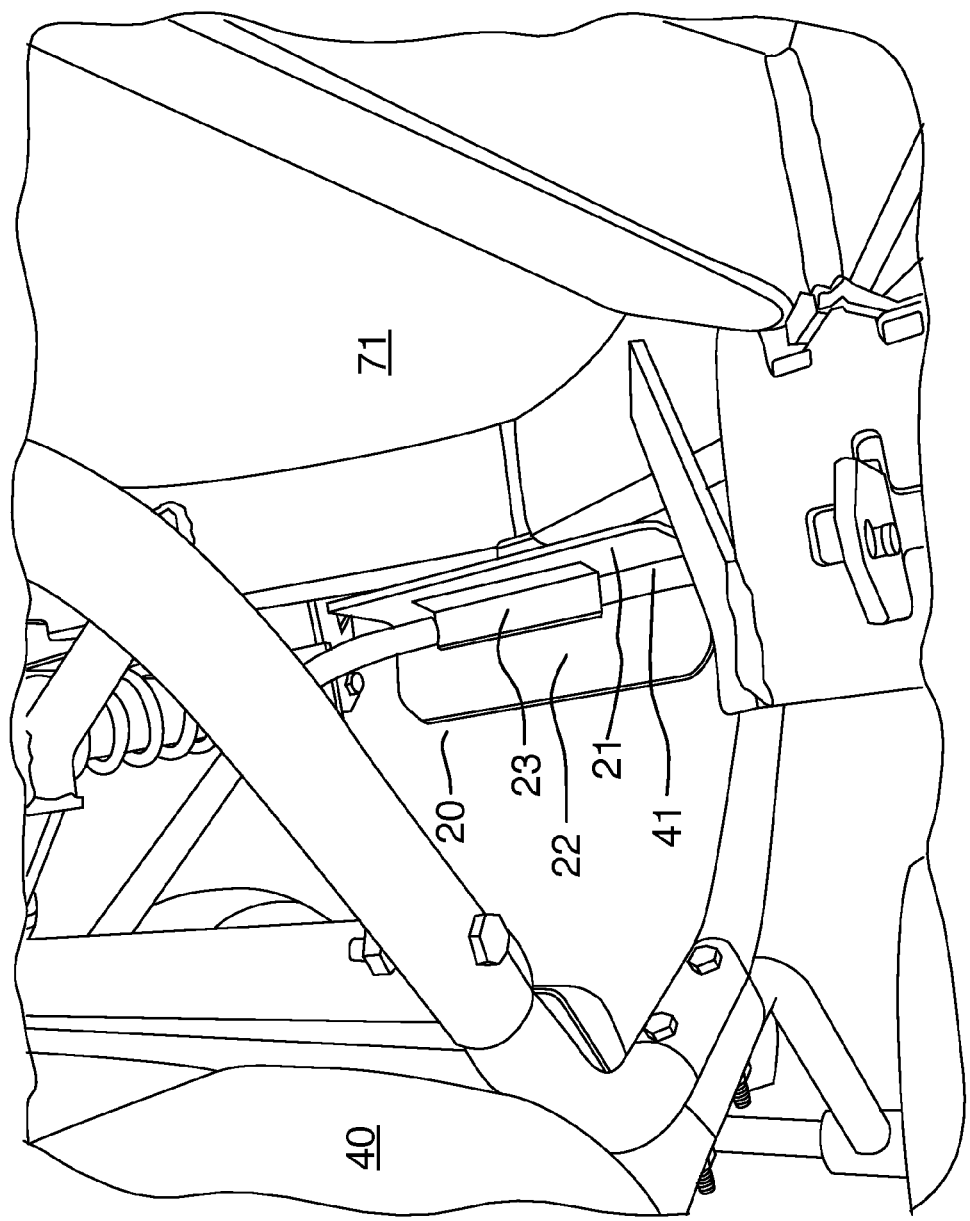
FIG. 7 shows a lower cross member of a broadcast spreader received within the bracket of FIG. 6.
Figure 8:
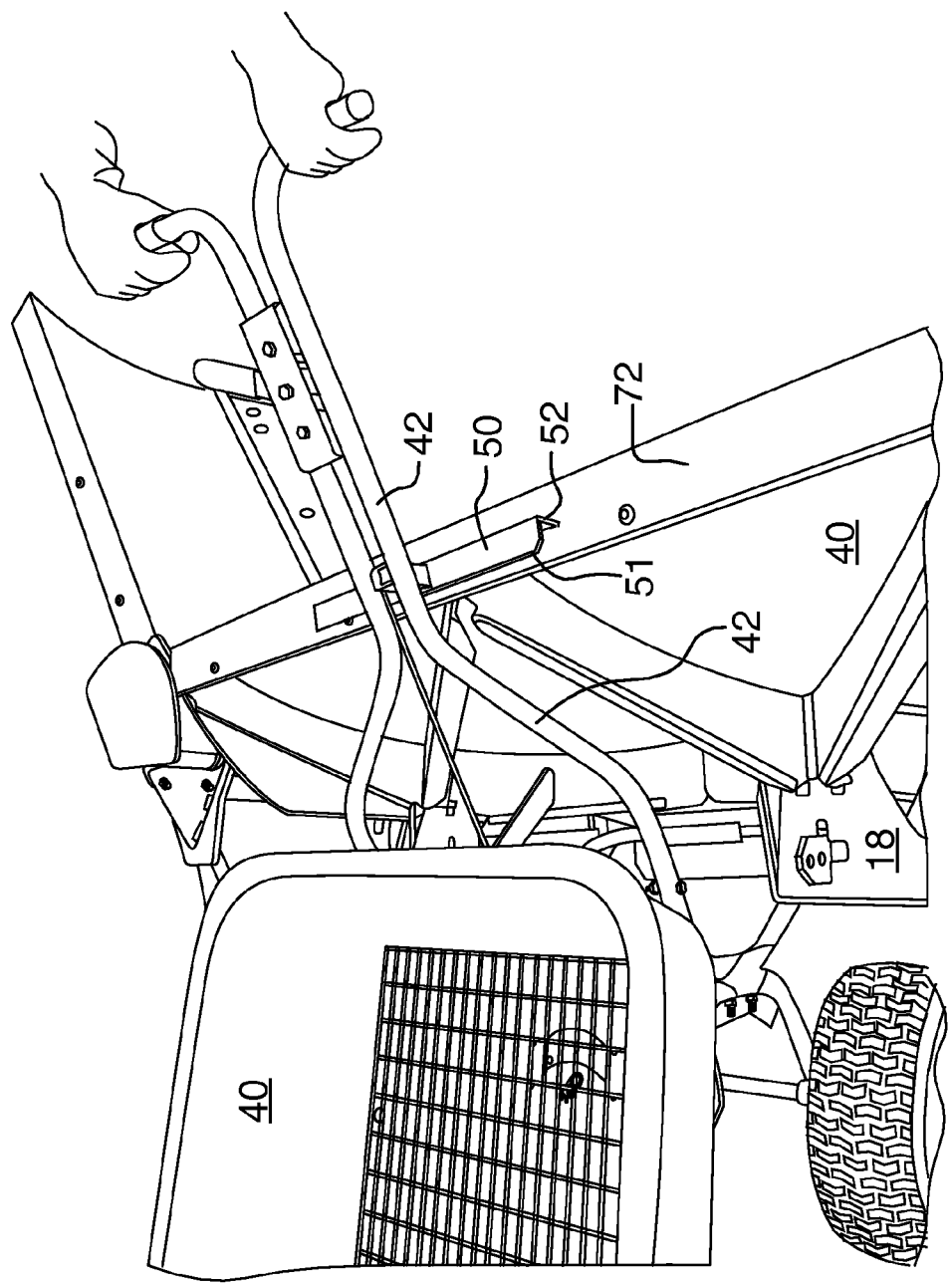
FIG. 8 shows a handle structure of a broadcast spreader in proximity with a mounting bracket.

Referring to FIG. 7, in use, the operator of the snow removal vehicle can position cross member 41 of equipment 40 within gap 24. Referring to FIG. 8, given that emptied broadcast spreaders are relatively light-weight, the operator can then, while gap 24 is in receipt of cross member 41, relatively easily pivot the piece of equipment 40 about cross member 41 to a storage position whereat handle structure 42 is disposed adjacent to mounting bracket 18. Contrary to the prior embodiment depicted in FIGS. 1-5, this embodiment does not require ramps as the piece of equipment 40 is significantly lighter than equipment 30. Instead, gap 24 of bracket 20 serves as a pivot point that permits the operator to relatively easily position equipment 40 into the storage position. It will be appreciated that although bracket 20 is disposed near the bottom of the snow plow blade in the figures, it may be positioned in other locations that similarly allow the operator to pivot the equipment 40 once cross member 41 is received within gap 24. For instance, cross member 41 may be located higher than that of the salt dropper in the figures, in which case it may be desirable to position bracket 20 higher on the rear of the plow blade so that gap 24 can receive cross member 41 by simply rolling equipment 40 towards the bracket until the cross member is received within the gap.

Figure 10:
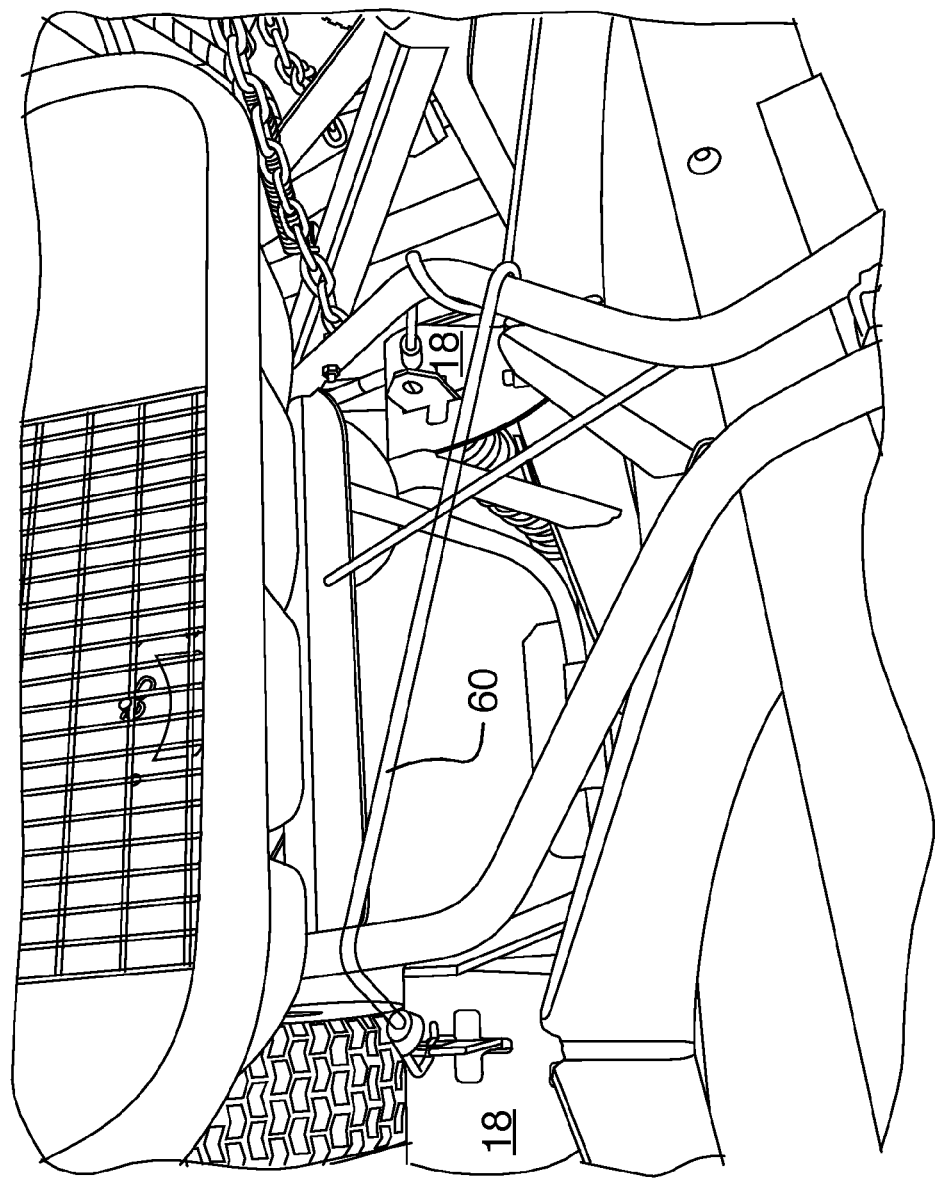
FIG. 10 shows a retaining mechanism releasably attached to a mounting bracket of the snow plow blade used to further retain a broadcast spreader.

Referring to FIG. 10, once equipment 30 is in the storage position, the operator can use the resilience in the handle structure 42 to temporarily hold equipment 40 in place while he or she retains the piece of equipment to the rear side of the blade by releasably attaching retaining mechanism 60 to mounting bracket 18. Retaining mechanism 60 is adapted to secure handle structure 42 to mounting bracket 18 when equipment 40 is in the storage position. It is expected that when equipment 40 is retained by its handle structure against the rear side of the blade by retaining mechanism 60, cross member 41 remains within gap 24. The retaining mechanism can be a bungee cord, chain, rope, ratchet strap, or other flexible material of similar strength.

Figure 9:
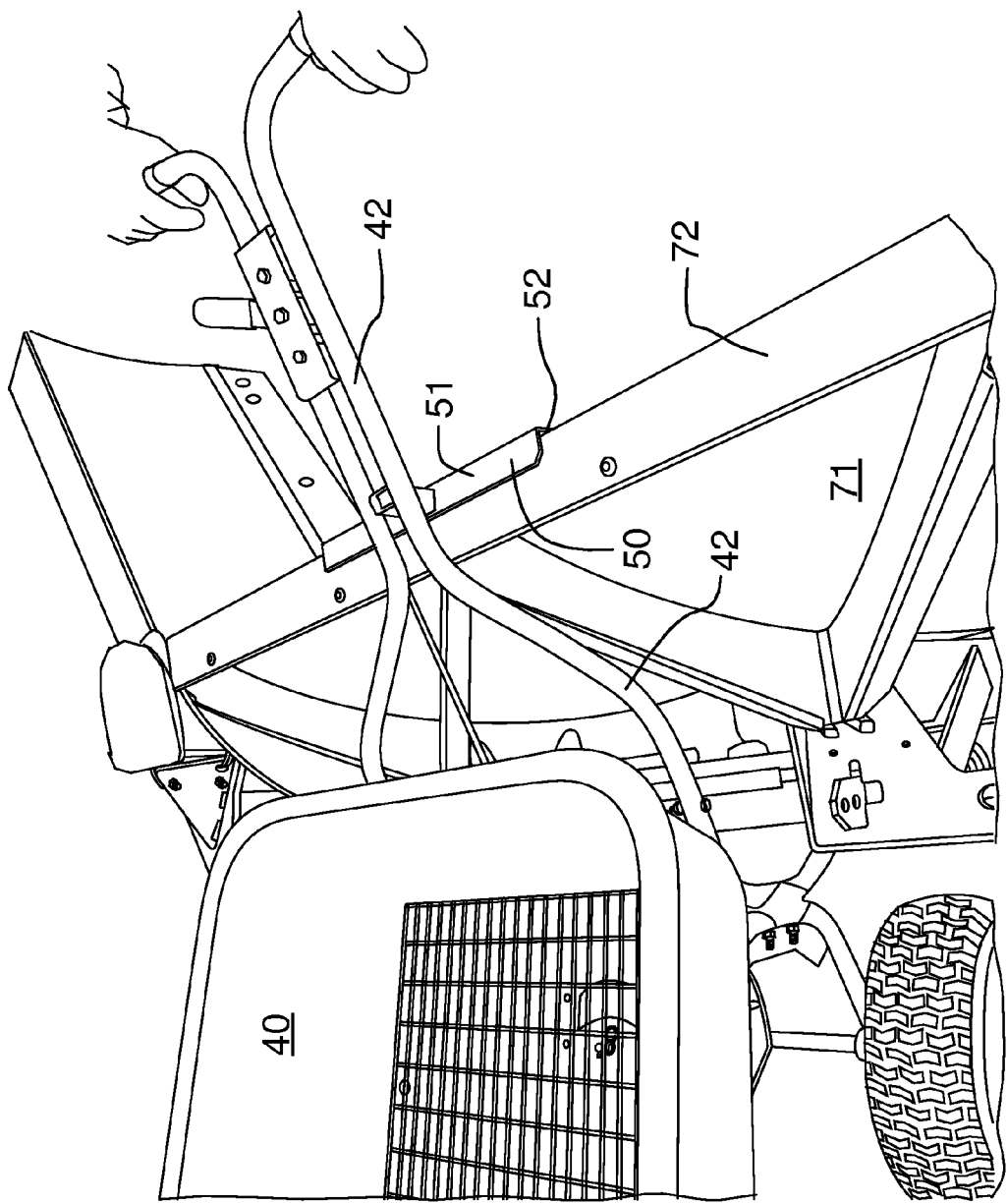
FIG. 9 shows a broadcast spreader in a storage position.

Referring to FIGS. 8 and 9, to further retain piece of equipment 40 against the plow blade, in a further embodiment, there is provided an equipment retainer 50, which, in use, is disposed on handle structure 42 and adapted to releasably engage top edge 72 of the blade when the piece of equipment 40 is in the storage position. In the embodiment shown, the equipment retainer comprises an elongate bar 51 and an elongate lip 52 generally orthogonally attached to the bar along a longitudinal edge of the bar. Other similar mechanisms can be used as an equipment retainer, such as hooks. FIG. 8 shows equipment 40 pivoted to a position whereat the equipment retainer is nearly in position for releasable engagement with the top edge of the plow blade. FIG. 9 depicts equipment 40 pivoted to a position whereat lip 52 has been be lowered to the front side (not shown) of the plow blade to releasably engage the plow blade. The flexible resilience in handle structure 42 permits the operator to maneuver equipment retainer 50 over the top edge 72 in order to position lip 52 on the front side of the blade.

When the broadcast spreader, or other like equipment 40, is held in the storage position, retaining roof 23 and elongate base 22 serve to substantially restrain vertical movement of the cross member and therefore of the equipment, while elongate side 21 (or alternatively, rear side 71 in embodiments not using the elongate side, but rather fixing the retaining roof and the elongate base directly to rear side 71 of the blade) serves to restrain forward movement of equipment 40 and retaining mechanism 60 and/or equipment retainer 50 serve to restrain rearward movement (i.e. toward the vehicle) of equipment 40.

In most cases, it is expected that bracket 20 and equipment retainer 50 are fixedly attached to rear side 71 of blade 70 and handle structure 42, respectively, for example, by welding, although other similar methods for secure attachment, permanent or not, are contemplated and within the scope of the present disclosure.

Aspects of the embodiments described may be combined. For example, bracket 20 may be used with ramp structures 12, 14. In such an embodiment, the ramp structures would not serve to facilitate lifting equipment 40, but to substantially restrain lateral movement of the equipment by, for example, engagement with opposite ends of cross member 41.

Figure 15:
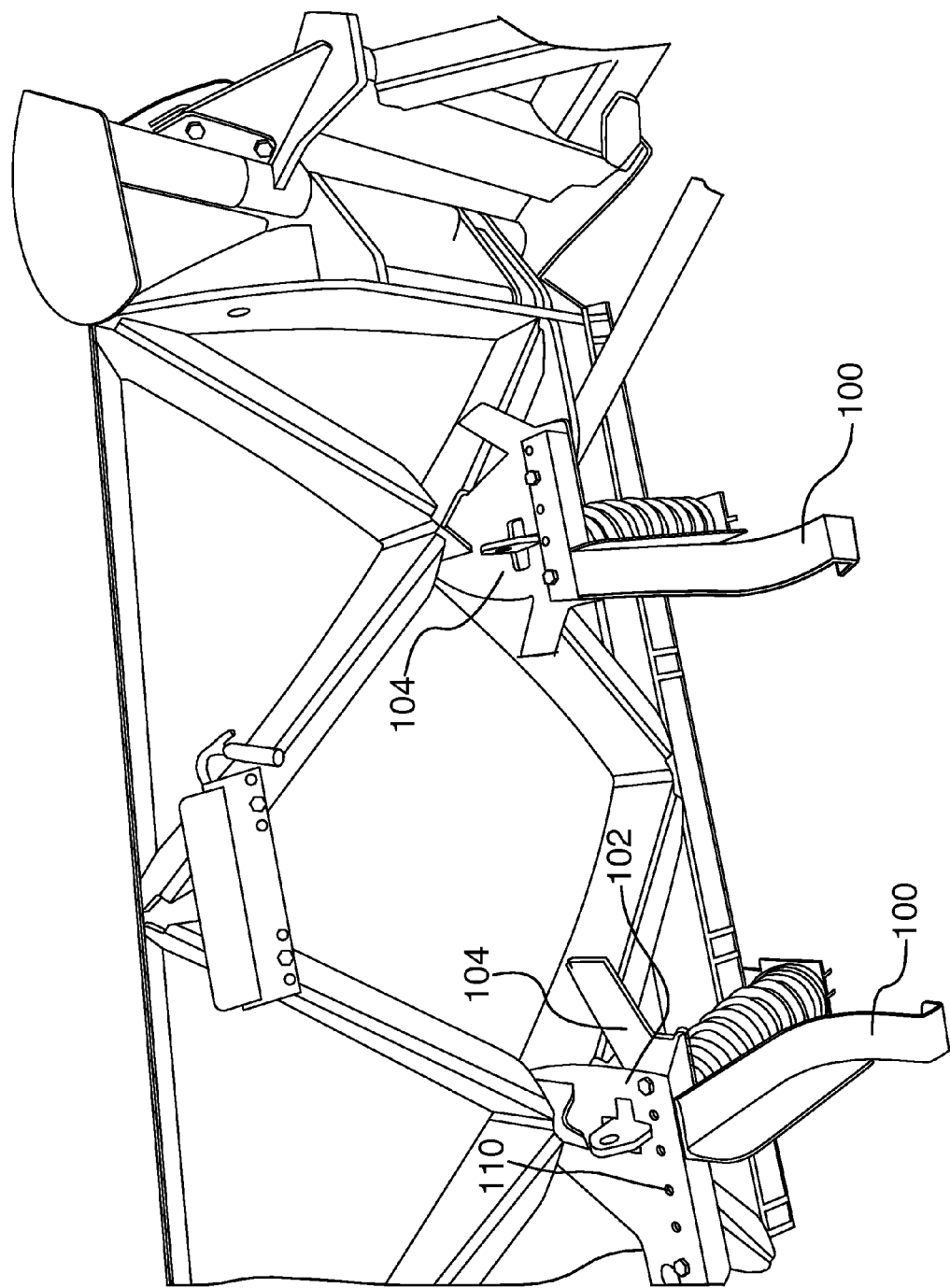
FIG. 15 is a perspective view of first and second ramp structures constructed in accordance with the present invention.
Figure 16:
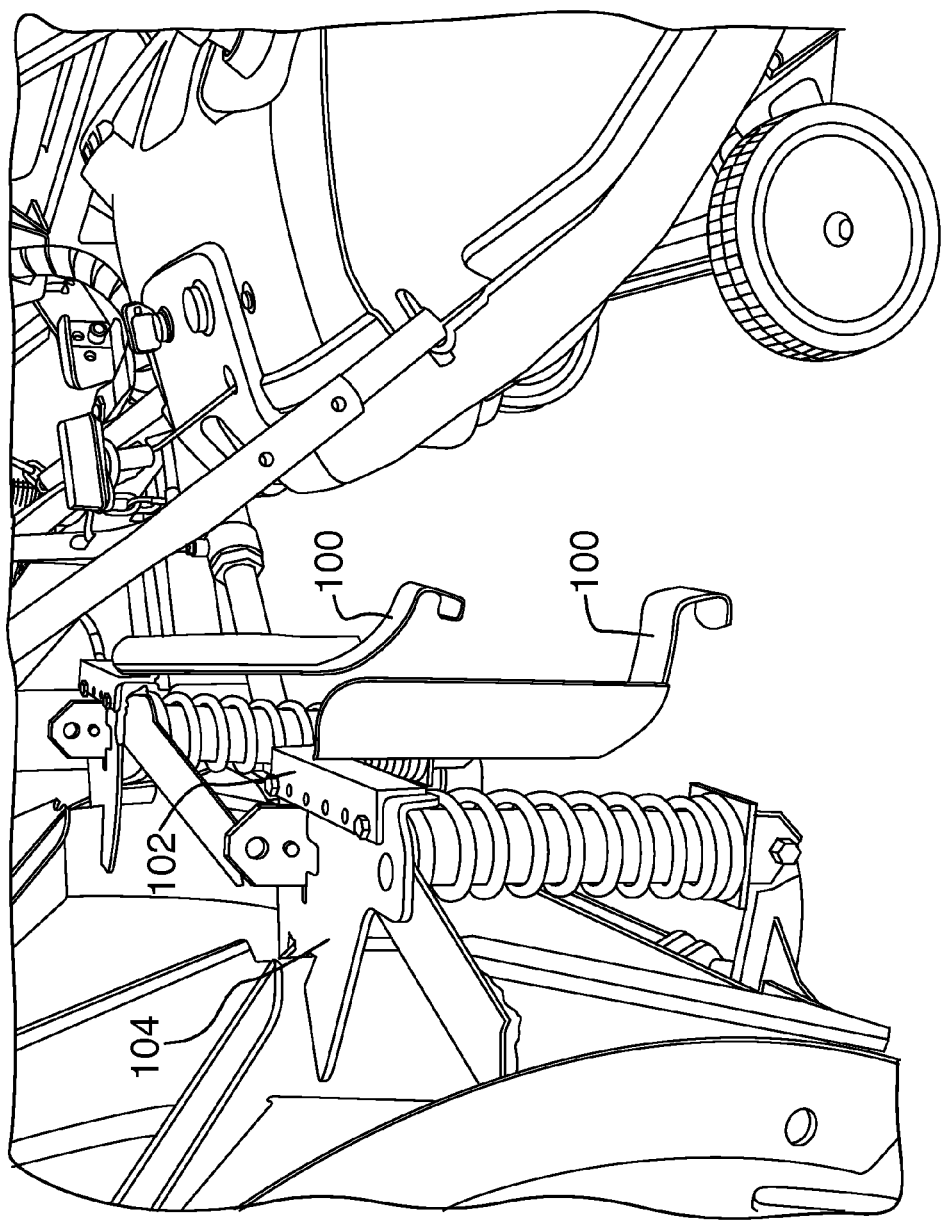
FIG. 16 is a side view of the first and second ramp structures of FIG. 15.
Figure 17:
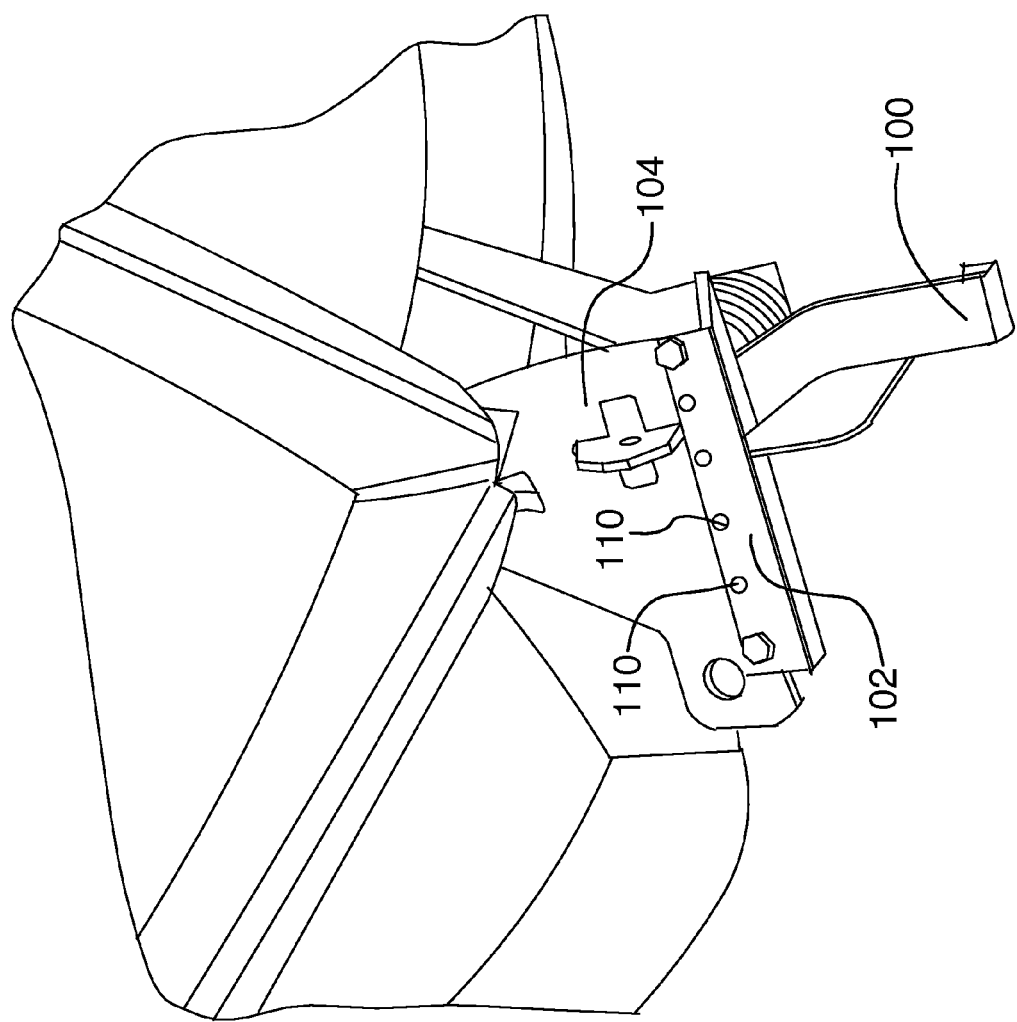
FIG. 17 is a top view of the first ramp structure of FIG. 15.

Referring to FIGS. 15 to 17, in another embodiment, each of the ramp structures 12, 14 further comprises a support platform 100 that projects therefrom, in use, away from the blade of the snow plow. In this embodiment, as the piece of equipment, such as a snow blower 30, is drawn to the receiving location, it can be disposed in a resting position and drawn to the receiving location from the resting position. In the resting position, each wheel 33 is rested atop the respective support platform 100. It is expected that the ability to dispose the piece of equipment at the resting position will further facilitate the positioning, by the operator, of the piece of equipment into the receiving location, as the operator will have the ability to temporarily rest the piece of equipment on the support platforms before hoisting it up, while traversing the ramp structures 12, 14, to releasably engage the cross member structure to the retaining structure.

Further, as best shown in FIG. 16, in use the ramp structures are typically disposed such that their respective support platforms are close enough to the ground that a simple tilting of the piece of equipment will permit engagement between the wheels 33 and the support platforms 100. In some cases, the ramp structures may be disposed such that no tilting is required to achieve this contact. In this way, the operator can more easily bring the wheels 33 into contact with the ramp structures 12, 14 by exerting a lateral, or predominantly lateral, force on the piece of equipment when the wheels are in contact with the support platforms.

Still with reference to FIGS. 15 to 17, each of the first and second ramp structures 12, 14 of the embodiments herein described may further comprise an adjusting member 102 for adjusting lateral placement of the respective ramp structure with respect to the blade. In these cases, the ramp structures are attached to the snow plow blade via the respective adjusting member, typically to a spring mount 104. Typically, the adjusting member is a piece of structural angle, such as an angle iron, that is fixedly attached to the ramp structure at one end of the ramp structure, and orthogonally thereto. The adjusting member may have one or more pre-drilled holes 110 to facilitate securement of the adjusting member to the snow plow blade. The adjusting member will typically have a length suitable for horizontal movement of the ramp structures while maintaining contact with the spring mount 104, and will typically comprise a plurality of the pre-drilled holes, spaced apart from one another, thereby facilitating the securement of the adjusting member at various horizontal placements in order to accommodate the various wheel spacings of different pieces of equipment.

Figure 20:
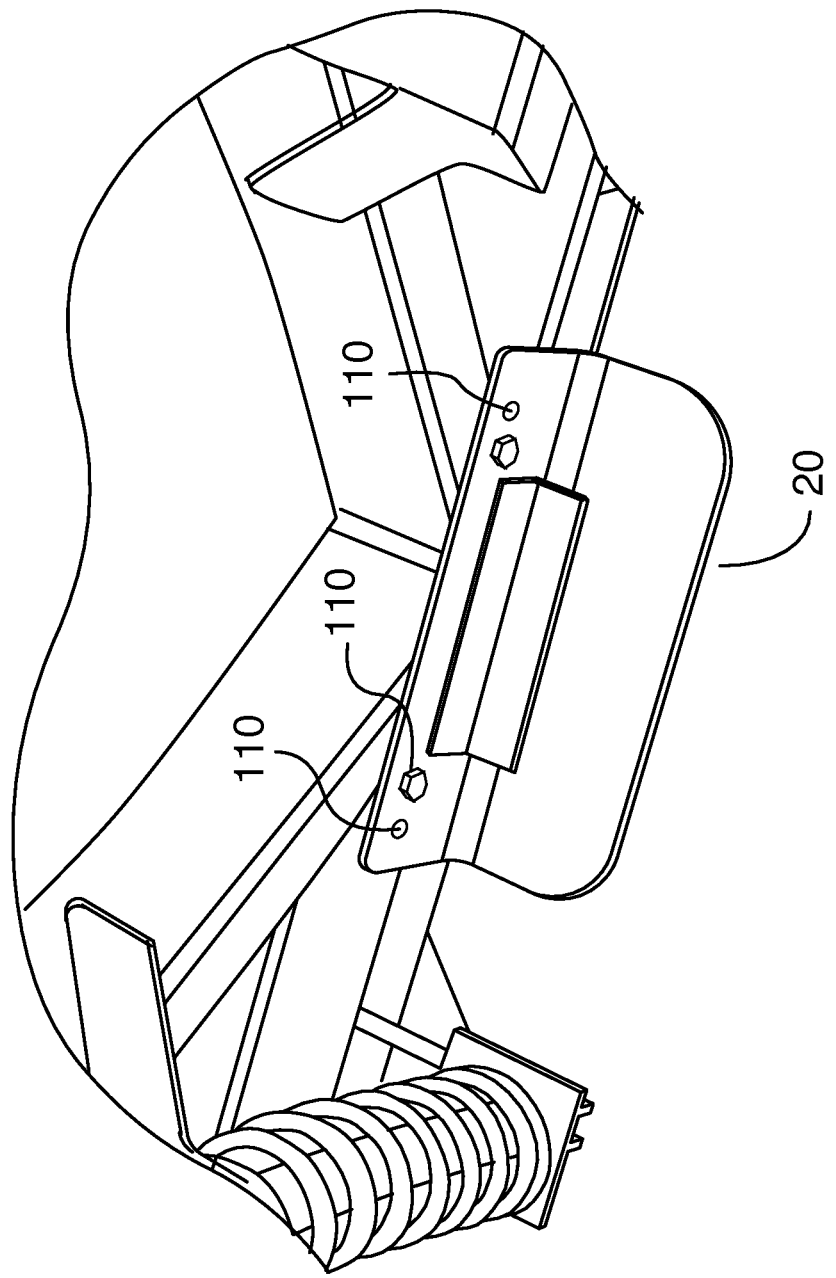
FIG. 20 is a front view of a bracket constructed in accordance with the present invention.

Referring to FIG. 20, bracket 20 may further comprise one or more pre-drilled holes 110. To facilitate mounting of the bracket to the snow plow blade at various horizontal placements, the bracket 20 may comprise a plurality of space-apart pre-drilled holes, and may be of sufficient length to permit horizontal movement thereof while maintaining contact with the rear side of the blade, or mounting bracket 18 thereon.

Figure 18:
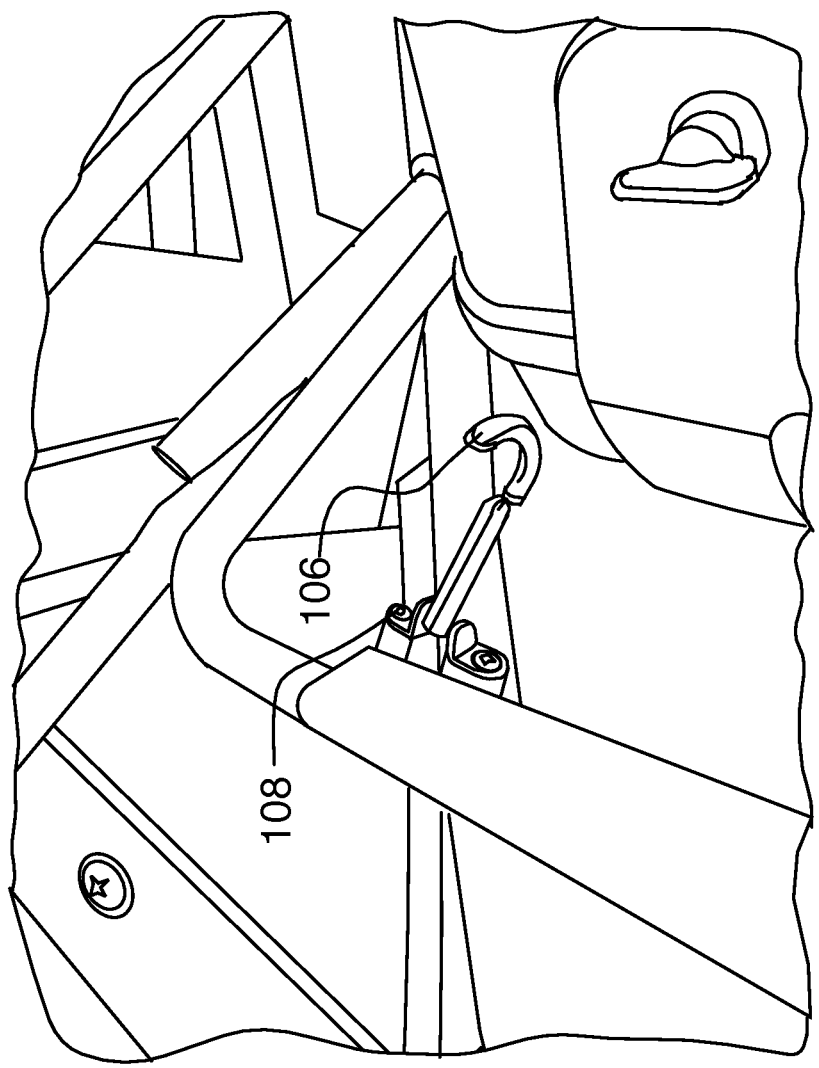
FIG. 18 is a perspective view of a retaining mechanism constructed in accordance with the present invention.
Figure 19:
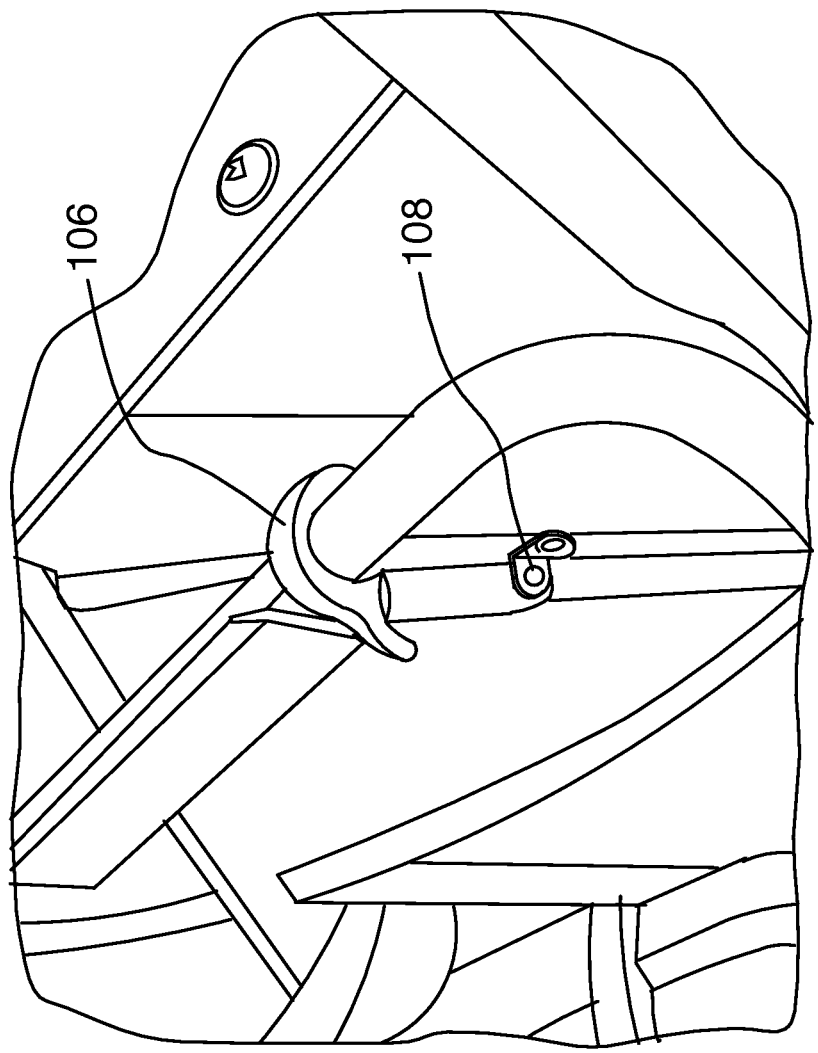
FIG. 19 is a perspective view of the retaining mechanism of FIG. 18, shown in an engaged arrangement.

Referring to FIGS. 18 and 19, retaining mechanism 60 may comprise hook 106 which is attached to the blade of the snow plow, typically to mounting bracket 18 thereon, by attachment bracket 108. The hook is pivotally attached to the attachment bracket so that, in use, when the cross member structure 32 of a snow blower 30 is releasably engaged by the retaining structure 16, or the handle structure 42 of a walk-behind broadcast spreader 40 is disposed adjacent the mounting bracket 18, the hook can be pivoted about the attachment bracket until the hook releasably engages the cross member structure or the handle structure, depending on the embodiment. In this way, the retaining mechanism is adapted for securing the cross member structure to the retaining structure when the piece of equipment is in the receiving location, or the handle structure to the mounting bracket when the piece of equipment is in the storage position, depending on the embodiment.

The hook can be spring-loaded so that it is biased in a compressed-spring position at which it maintains tension on the cross member structure or handle structure to which it is releasably engaged. Releasement of the hook from the member to which is it engaged would involve exertion of a force on the hook to extend the spring from its compressed position to a position whereat the hook clears the cross member structure or handle structure, depending on the embodiment, such that the hook can be pivoted away therefrom. The hook may, alternatively, or additionally, be comprised of a flexibly resilient material, such as a semi-rigid plastic, in order to facilitate releasable engagement with the cross member structure or handle structure by flexure of the hook.

Figure 11:
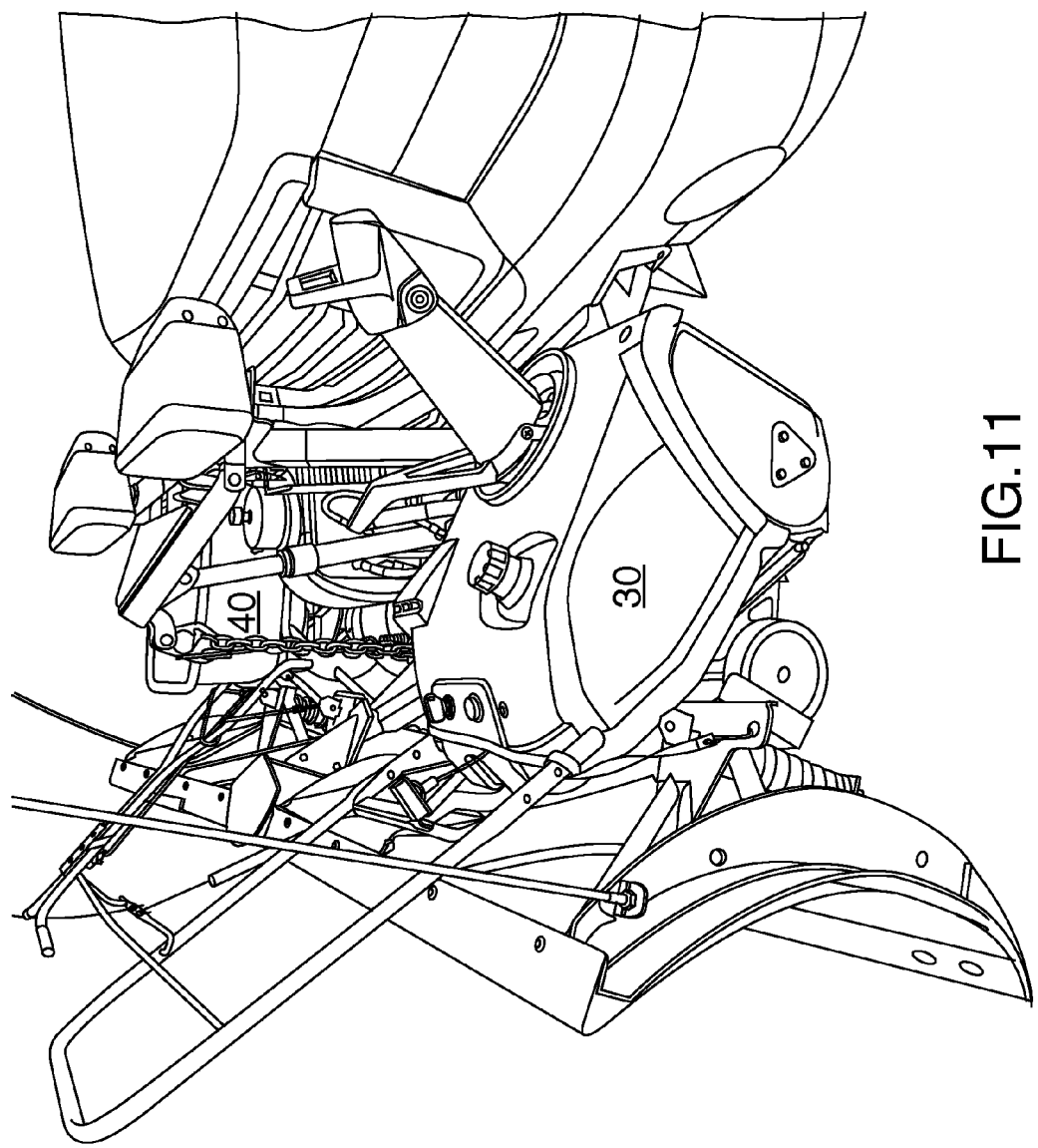
FIG. 11 shows a snow blower in the receiving location and a broadcast spreader in the storage position suspended above the ground while the snow plow is in a straight orientation.
Figure 12:
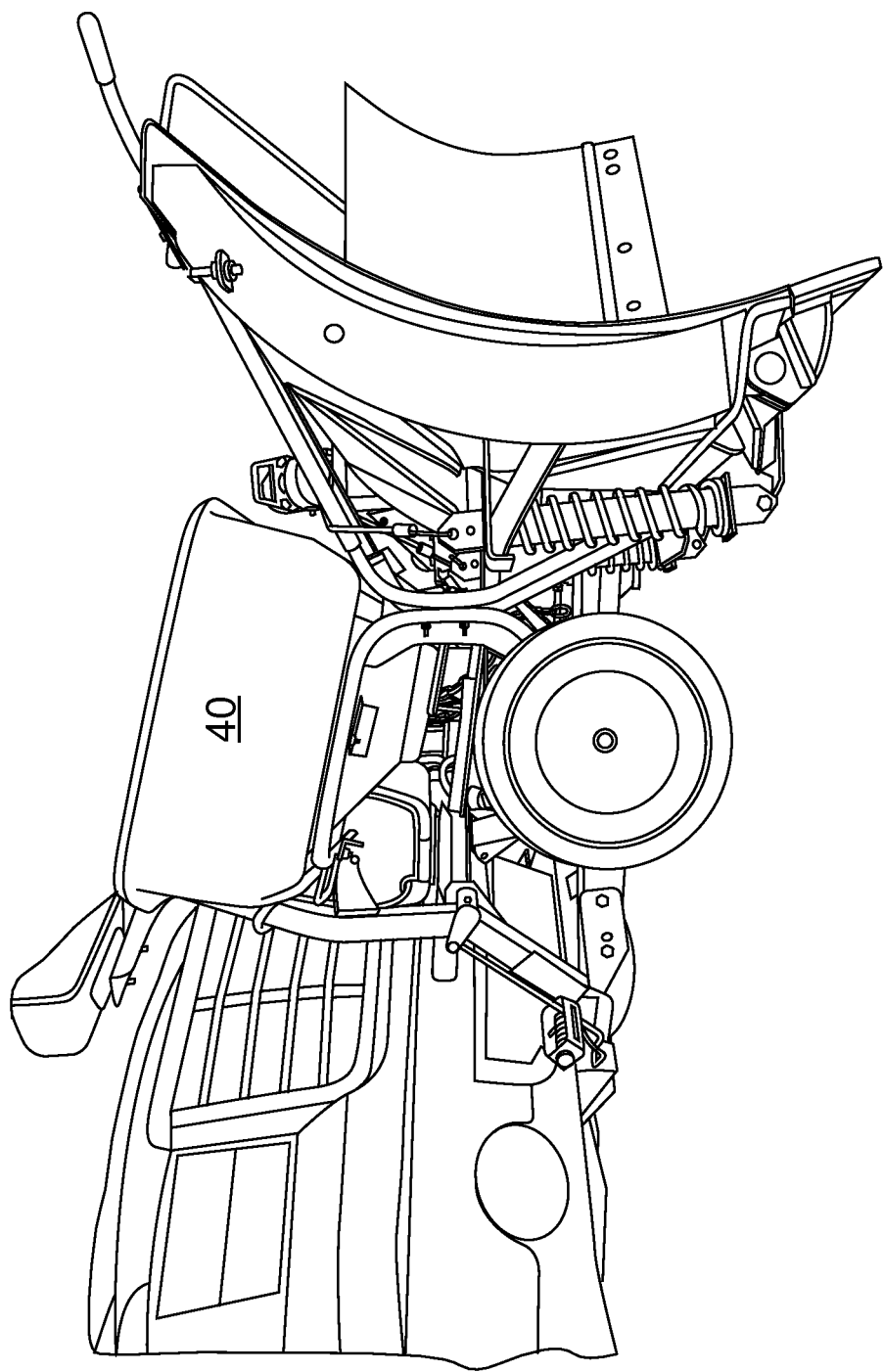
FIG. 12 shows a broadcast spreader in the storage position and suspended above the ground when the snow plow blade is in contact with the ground.

The embodiments described are expected to allow the operator of a snow removal vehicle to quickly, efficiently and effectively load and unload snow removal or other like equipment from the rear side of a snow plow blade. The invention precludes the need for a bulky and heavy blade-mounted platform which does little to restrain movement of the equipment while the vehicle is in transit. Further, because of the minimalistic profile of the described embodiments, the pieces of equipment can be releasably engaged to the rear of the snow plow blades while the plow blades are retracted into a straight plow orientation, as depicted in FIG. 11. Further still, as the described embodiments allow the equipment to remain suspended above ground while the snow plow blades are in contact with the ground surface, as depicted in FIGS. 12 and 13, it is expected that the snow removal vehicle operator can plow snow without having to first remove the equipment from the plow blades.

It is to be understood that what has been described are the preferred embodiments of the invention. The scope of the claims should not be limited by the preferred embodiments set forth above, but should be given the broadest interpretation consistent with the description as a whole.

The invention claimed is:

1. A system for releasably engaging, to a blade of a snow plow, a piece of equipment having a cross member structure and a pair of wheels, the cross member structure and the wheels being arranged in the manner of the cross member structure of a handle frame and the wheels of a walk-behind snow blower, the system comprising:
   a first ramp structure,
   a second ramp structure, and
   a retaining structure,
   wherein the system includes a loaded position where the piece of equipment engages the blade of the snow plow and an unloaded position where the piece of equipment is disengaged from the blade of the snow plow,
      each of said first and said second ramp structures are disposed on a rear side of said blade to define inclined ramps,
      said retaining structure is disposed on the rear side of the blade between and above said ramp structures, and
      said ramp structures and retaining structure define a receiving location,
   wherein the retaining structure is shaped and dimensioned such that, when the piece of equipment is in the receiving location and in the loaded position, the retaining structure releasably engages the cross member structure to suspend the piece of equipment above the ground via the cross member structure,
   wherein the ramp structures are shaped and dimensioned such that the piece of equipment can be drawn to the receiving location and as the piece of equipment is so drawn, the wheels traverse the ramp structures.

2. The system of claim 1, wherein in the loaded position the ramp structures contact said wheels to substantially restrain lateral movement of said equipment.

3. The system of claim 1, wherein each of said first and second ramp structures comprises a support platform projecting therefrom, wherein the support platforms project away from the blade of the snow plow, and as the piece of equipment is drawn to the receiving location, the piece of equipment is disposed in a resting position whereat the wheels are rested atop the respective support platforms, and the piece of equipment is drawn to the receiving location from the resting position in the loaded position.

4. The system of claim 1, wherein each of said first and second ramp structures further comprises an adjusting member adjusting a lateral placement of the respective ramp structure with respect to the blade, the respective ramp structure attached to the blade via the respective adjusting member.

5. The system of claim 1, further comprising a retaining mechanism securing the cross member structure to the retaining structure when the piece of equipment is in the receiving location, the retaining mechanism comprising a hook attached to the blade by an attachment bracket to which the hook is pivotally attached, wherein when the cross member structure is releasably engaged by the retaining structure, the hook is pivotal about the attachment bracket wherein the hook releasably engages the cross member structure.

* * * * *